United States Patent
Kanuri et al.

(10) Patent No.: US 9,065,126 B2
(45) Date of Patent: Jun. 23, 2015

(54) FUEL CELL STACK CONDITIONED TO OPERATE SAFELY WITH FAILED CELLS

(75) Inventors: Sridhar V. Kanuri, Milford, CT (US); Timothy W. Patterson, East Hartford, CT (US)

(73) Assignee: AUDI AG, Ingolstadt (DE)

( * ) Notice: Subject to any disclaimer, the term of this patent is extended or adjusted under 35 U.S.C. 154(b) by 1140 days.

(21) Appl. No.: 12/736,955

(22) PCT Filed: Jul. 9, 2008

(86) PCT No.: PCT/US2008/008437
§ 371 (c)(1),
(2), (4) Date: Feb. 2, 2011

(87) PCT Pub. No.: WO2010/005415
PCT Pub. Date: Jan. 14, 2010

(65) Prior Publication Data
US 2011/0117469 A1 May 19, 2011

(51) Int. Cl.
*H01M 8/02* (2006.01)
*H01M 8/24* (2006.01)
*H01M 8/04* (2006.01)

(52) U.S. Cl.
CPC .......... *H01M 8/2405* (2013.01); *H01M 8/0286* (2013.01); *H01M 8/0284* (2013.01); *H01M 8/0276* (2013.01); *H01M 8/028* (2013.01); *H01M 8/04089* (2013.01);
(Continued)

(58) Field of Classification Search
CPC .......................... H01M 8/0286; H01M 8/0284
USPC ........................................ 429/8, 49, 400–535
See application file for complete search history.

(56) References Cited

U.S. PATENT DOCUMENTS

2002/0055034 A1    5/2002   Fukuda et al.
(Continued)

FOREIGN PATENT DOCUMENTS

| DE | 102 15 913 C1 | 10/2003 |
| EP | 1 517 393 A2 | 3/2005 |

(Continued)

OTHER PUBLICATIONS

English language abstract of JP 61279071 to Mitsugi et al. originally published Dec. 1986.*

(Continued)

*Primary Examiner* — Jonathan G Leong
(74) *Attorney, Agent, or Firm* — Seed IP Law Group PLLC

(57) ABSTRACT

The oxidant inlets of the reactant gas flow field grooves (41) of a fuel cell (11) which suffers a crossover between the fuel and oxidant flow fields, due to a leak in the seals, the maxtrix or the membrane of the fuel cell, are blocked with a liquid (50) which cures in place, hot glue, two-part epoxy, or fluoroelastomers. This prevents heating as a result of combusting fuel with oxygen near the site, which avoids excessive heating and damaging of successive fuel cells. As a result, a fuel cell power plant (8) can continue to operate with only a minor loss of voltage and power, thereby avoiding the need to tear down the stack by loosening the tie-bolts. Voltage and hydrogen levels may be used to detect the crossover. The particular cell (11) with the leak can be determined by voltage or hydrogen monitoring, or by immersing the stack in a liquid while applying gas to the fuel inlet of the stack.

15 Claims, 4 Drawing Sheets

(52) U.S. Cl.
CPC ..... *H01M 8/04246* (2013.01); *H01M 8/04261* (2013.01); *Y02E 60/50* (2013.01)

(56) References Cited

U.S. PATENT DOCUMENTS

| | | |
|---|---|---|
| 2004/0121204 A1 | 6/2004 | Adelman et al. |
| 2005/0064254 A1 | 3/2005 | Bourgeois |
| 2008/0038596 A1 | 2/2008 | Cornet |

FOREIGN PATENT DOCUMENTS

| | | |
|---|---|---|
| JP | 61 279071 A | 12/1986 |
| JP | 61279071 A * | 12/1986 |
| JP | 63 248074 A | 10/1988 |

OTHER PUBLICATIONS

PCT International Search Report mailed on May 6, 2009 for PCT Application No. PCT/US2008/008437 (3 pages).

* cited by examiner

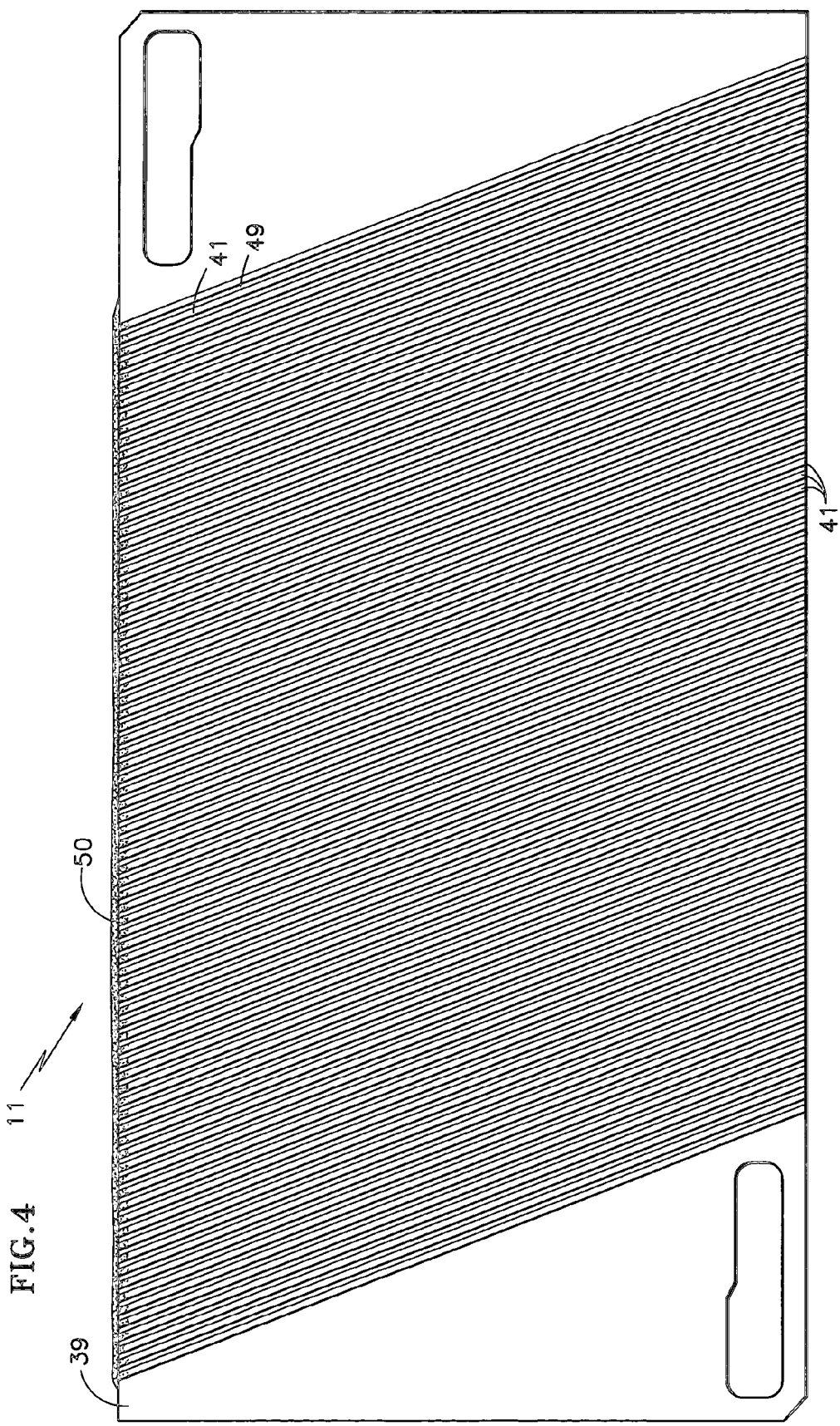

FUEL CELL STACK CONDITIONED TO OPERATE SAFELY WITH FAILED CELLS

TECHNICAL FIELD

Excessive localized heating as a result of leaks between fuel and oxidant reactant flow fields of a fuel cell, and possible total failure of a fuel cell stack, is prevented by a remedy in which the inlets to oxidant flow field grooves of any single fuel cell which has such a leak are blocked.

BACKGROUND ART

If either the membrane of a PEM fuel cell or SiC matrix of a phosphoric acid fuel cell or the seal of a fuel cell develops a leak that permits reactant cross over, so that anode fuel gas is mixed with cathode oxidant gas, the resulting heat from combustion of the fuel can become sufficiently high to affect adjacent cells, which in turn can affect additional adjacent cells, leading to the failure of an entire cell stack assembly by melting or cracking of seals, membranes and other components. Therefore, leakage between cathode and anode gases of even one single cell of a cell stack assembly cannot be tolerated.

Heretofore, any failed cell must be removed from the power plant. To remove the cell, the manifolds must be removed and the entire cell stack assembly has to be disassembled. If the failure occurs at the beginning of life of the cell stack assembly due to manufacturing defects, this may not be too significant. But if the failure occurs after extended periods of operation, releasing the pressure on the various cells can cause additional failure, such as the breakage of membranes which would otherwise remain operable.

The process of removing a cell by unstacking the cell stack assembly is time-consuming and expensive.

The prior art process of unstacking a fuel cell to remove a failed cell dictates that certain design features, such as adhesive seals, are not considered as appropriate, since the use of such features would inhibit the ability to remove a failed cell.

SUMMARY

A failed fuel cell having a leak in its SiC matrix, or in its membrane, or in a seal, resulting in the combustion of fuel with oxygen, is prevented from becoming overheated by blocking the oxidant inlets of the leaking fuel cell. In one embodiment of the remedy, the oxidant reactant gas flow field grooves are blocked by means of a liquid sealant that cures in place; other embodiments may utilize hot glue or two-part epoxy or fluoroelastomers.

Other variations will become apparent in the light of the following detailed description of exemplary embodiments, as illustrated in the accompanying drawings.

BRIEF DESCRIPTION OF THE DRAWINGS

FIG. 4 is a side elevation view of the fuel cell of FIG. 3, with some groove outlets blocked.

MODE(S) OF IMPLEMENTATION

Figure 1:
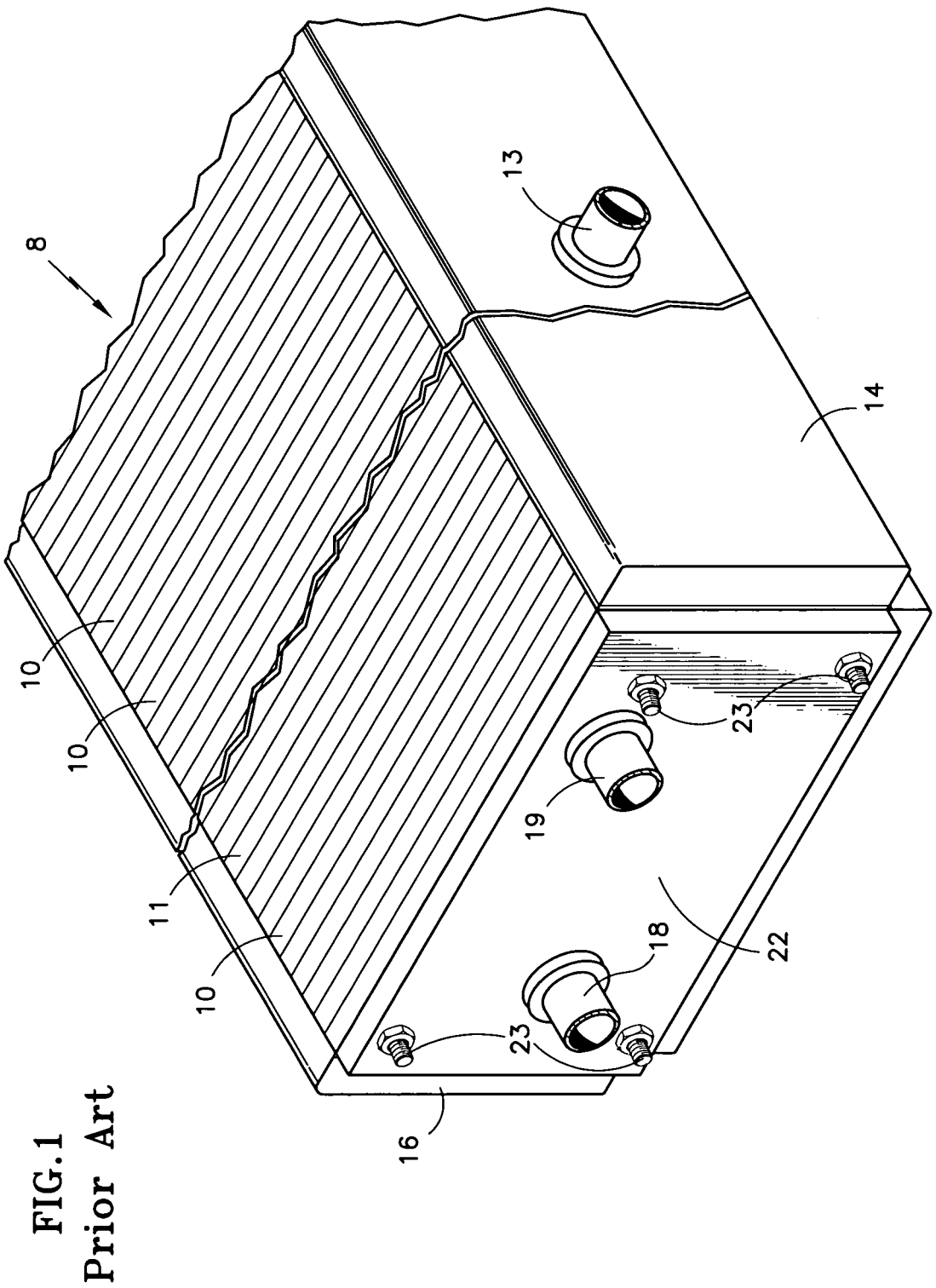
FIG. 1 is a simplified, stylized, partial perspective view of a fuel cell stack with external air manifolds removed.

Referring to FIG. 1, a fuel cell stack 8, known to the prior art, is shown with its air inlet manifold removed so as to reveal the upper edges of a plurality of fuel cells 10, 11. A fuel inlet pipe 13 is shown connected with the fuel inlet side of a fuel inlet/outlet manifold 14. A fuel turn manifold 16 is also shown.

A typical stack 8 will have a coolant inlet pipe 18 and a coolant outlet pipe 19 plumbed into coolant manifolds. Cell stacks with internal coolant manifolds are plumbed through an end plate or pressure plate 22 which is pressed together with a pressure plate (not shown) at the opposite end of the stack 8, by means of tie-rods 23. In cell stacks with external coolant manifolds, coolant is supplied through external ports.

Figure 2:
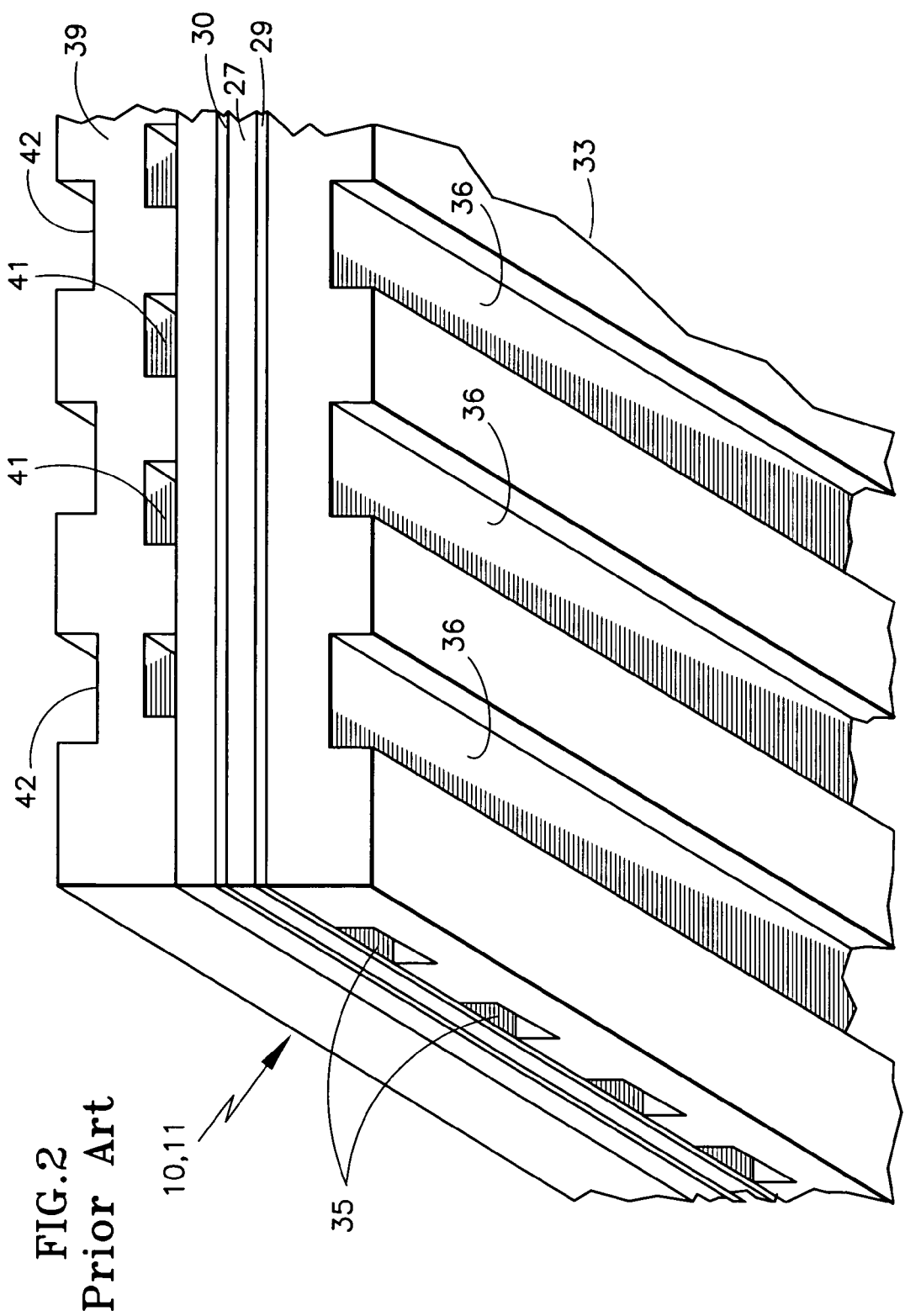
FIG. 2 is a simplified, stylized, partial perspective view of a fuel cell which may be included in the stack of FIG. 1.

A fuel cell 10, 11 known to the art is illustrated in FIG. 2. The fuel cell comprises an electrode assembly 27, which includes a proton exchange membrane or SiC matrix sandwiched between an anode and a cathode, not shown for clarity. In different fuel cell designs, either or both support plates 29, 30 may have a fine pore, hydrophobic, or partially hydrophobic bilayer or gas diffusion layer (not shown for clarity) disposed between a substrate and the anode or the cathode, respectively. The details of a particular fuel cell may vary within the purview of the stack salvaging process herein.

The fuel cells 10, 11 may typically include an anode separator plate 33, which may be porous or non-porous, hydrophilic or hydrophobic, with fuel flow field grooves 35 and coolant flow field grooves 36 therein. A cathode separator plate 39, which may be porous or non-porous, hydrophilic or hydrophobic, has oxidant reactant gas flow field grooves 41 and coolant flow field grooves 42.

Typical fuel cells 10, 11 have edge seals (not shown for clarity) to retain reactant gases and coolant in their proper spaces. The edge seals and the electrode assembly 27 keep the fuel and oxidant gases separate from each other. In the event of a leak between the fuel grooves 35 and the oxidant grooves 41 the fuel will oxidize creating localized heat at the catalyst layer adjacent to the leak. The extent of the leak will increase with heat. Adjacent fuel cells in the same area will be heated increasing the likelihood that they also fail, which will in turn generate more heat as the fuel and oxidant being supplied to those fuel cells combust.

Figure 3:
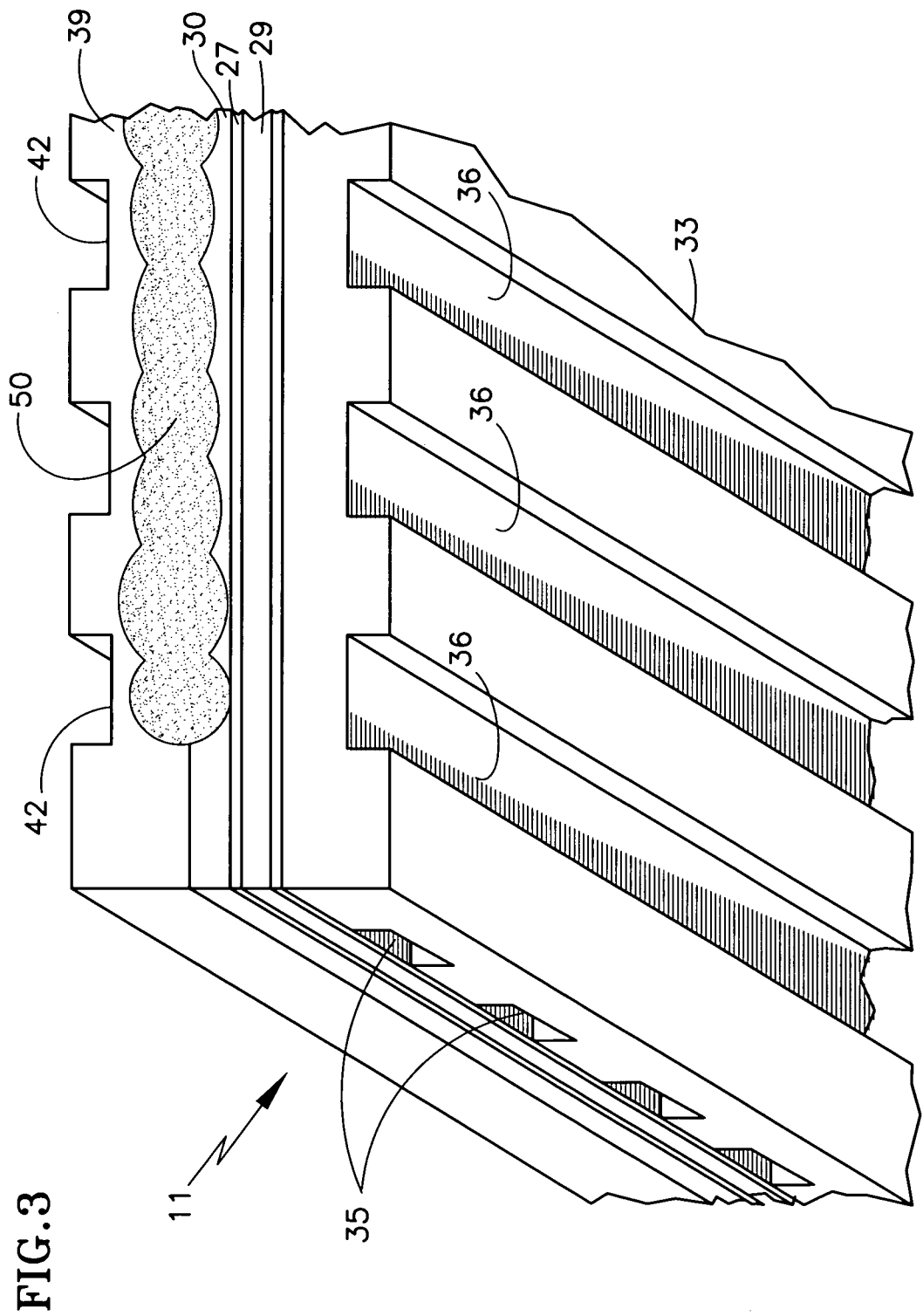
FIG. 3 is a perspective view of the fuel cell of FIG. 2, with its air flow field groove inlets blocked.

To prevent cell overheating, the present remedy blocks the inlets to the air flow field grooves 41 with sealant 50 as illustrated in FIG. 3 and FIG. 4. The sealant may be a liquid which cures in place, hot glue, two-part epoxy or fluoroelastomers. Once the oxygen is blocked from reaching the failed cell electrode, hydrogen is evolved on the cathode during load operation. This hydrogen can escape through the cathode exhaust. Because there is no catalyst available in the cathode exhaust, the hydrogen will not react with oxygen in the cathode exhaust unless the flammability limit is exceeded; and even then, an ignition source would be needed, which is unlikely. Most likely, the hydrogen will be swept away by the cathode exhaust and be exhausted, unconsumed, into the environment.

To assure that the hydrogen concentration in the cathode exhaust will remain below one quarter of the lower flammability limit for hydrogen (4%), the maximum number of cells that can be blocked will depend on the characteristics of the fuel cells and the pressure and flow rates of hydrogen in comparison with the flow rates of oxygen in the stack. An example might be that in a stack of 220 cells, the maximum number of cells that could be blocked would be about seven (about 3% of the cells).

In order to detect the fact that a reactant gas crossover (a leak) has occurred before catastrophic damage to the stack develops, and thereby be able to apply the remedy herein, various factors may be monitored. For instance, it is possible to sense a sustained lowering of voltage at any point on the performance curve; if individual cell voltage monitors are installed on the stack, the loss of voltage at an injured cell will indicate not only that there is a failure, but where that failure is.

Another way of determining that a crossover has occurred is to monitor the hydrogen level in the cathode exit manifold.

When a crossover has been detected, the particular cell or cells involved can be determined by the aforementioned individual cell voltage monitors, or by probing the cells through voltage monitoring ports (if provided in the particular stack involved). Alternatively, with a stack using external manifolds, the air inlet manifold may be removed. Then, the entire stack can be immersed in water while applying a gas (such as nitrogen or plain air) to the fuel inlet pipe, and noting the appearance of bubbles from the cathode flow field of a particular cell. With internal manifolds, assuming no leakage between coolant and reactants, using arthroscopic-like implements to detect the leaky cell looking into the end of the air inlet manifold, the leaky cell can be detected. Then, similar implements may be used to plug the juncture between the air inlet manifold and the cathode flow field of the leaky cell.

The important thing is not to release the pressure applied to the stack by the tie-rods. The remedy herein avoids the need to unstack the fuel cell stack.

The invention claimed is:

1. A method characterized by:
    determining a particular fuel cell within a fuel cell stack in which crossover of reactant gases has occurred as a consequence of a leak between fuel reactant gas flow field grooves and oxidant reactant gas flow field grooves of said particular fuel cell; and
    blocking groove inlets of the oxidant reactant gas flow field grooves in said particular fuel cell with a sealant.

2. A method according to claim 1 further characterized in that:
    the sealant is a liquid which cures in place.

3. A method according to claim 1 further characterized in that:
    the sealant is hot glue.

4. A method according to claim 1 further characterized in that:
    the sealant is two-part epoxy.

5. A method according to claim 1 further characterized in that:
    the sealant comprises fluoroelastomers.

6. A method according to claim 1 further characterized in that said step of determining comprises:
    immersing the fuel cell stack in a liquid while applying gas to all of the fuel reactant gas flow fields of the stack, and detecting the fuel cell from which said gas emerges.

7. A method according to claim 1 further characterized in that said step of determining comprises:
    monitoring voltages of cells in said stack while said stack is in operation.

8. A method according to claim 1 further characterized in that said step of determining comprises:
    monitoring hydrogen levels at the cathode exhaust of said fuel cell stack.

9. A method according to claim 1 further characterized in that:
    said step of determining comprises (a) monitoring the hydrogen level in an exit manifold associated with the oxidant reactant gas flow field while the fuel cell stack is in operation to determine that a crossover leak has occurred, and then (b) determining the particular fuel cell in which the crossover leak has occurred.

10. A fuel cell stack having a crossover leak remedied by the method of claim 1.

11. A method comprising:
    determining a particular fuel cell within a fuel cell stack in which crossover of reactant gases has occurred as a consequence of a leak between fuel reactant gas flow field grooves and oxidant reactant gas flow field grooves of said particular fuel cell; and
    blocking groove inlets of the oxidant reactant gas flow field grooves in said particular fuel cell with a sealant selected from the group consisting of a liquid which cures in place, hot glue, two-part epoxy and fluoroelastomers.

12. The method of claim 11 wherein determining the particular fuel cell within the fuel cell stack in which crossover of reactant gases has occurred includes immersing the fuel cell stack in a liquid while applying gas to all of the fuel reactant gas flow fields of the stack, and detecting the fuel cell from which said gas emerges.

13. The method of claim 11 wherein determining the particular fuel cell within the fuel cell stack in which crossover of reactant gases has occurred includes monitoring voltages of cells in said stack while said stack is in operation.

14. The method of claim 11 wherein determining the particular fuel cell within the fuel cell stack in which crossover of reactant gases has occurred includes monitoring hydrogen levels at the cathode exhaust of said fuel cell stack.

15. The method of claim 11 wherein determining the particular fuel cell within the fuel cell stack in which crossover of reactant gases has occurred includes monitoring the hydrogen level in an exit manifold associated with the oxidant reactant gas flow field while the fuel cell stack is in operation to determine that a crossover leak has occurred, and then determining the particular fuel cell in which the crossover leak has occurred.

\* \* \* \* \*